US012592962B2

(12) United States Patent
Avadhanam

(10) Patent No.: US 12,592,962 B2
(45) **Date of Patent: \*Mar. 31, 2026**

(54) DYNAMIC CLOUD WORKLOAD REALLOCATION BASED ON ACTIVE SECURITY EXPLOITS IN DYNAMIC RANDOM ACCESS MEMORY (DRAM)

(71) Applicant: Oracle International Corporation, Redwood Shores, CA (US)

(72) Inventor: Phani Bhushan Avadhanam, San Diego, CA (US)

(73) Assignee: Oracle International Corporation, Redwood Shores, CA (US)

( \* ) Notice: Subject to any disclaimer, the term of this patent is extended or adjusted under 35 U.S.C. 154(b) by 87 days.

This patent is subject to a terminal disclaimer.

(21) Appl. No.: 18/410,717

(22) Filed: Jan. 11, 2024

(65) Prior Publication Data

US 2024/0146764 A1 May 2, 2024

Related U.S. Application Data

(63) Continuation of application No. 17/463,488, filed on Aug. 31, 2021, now Pat. No. 11,902,323.

(51) Int. Cl.
*H04L 9/40* (2022.01)
*G06F 12/14* (2006.01)
(Continued)

(52) U.S. Cl.
CPC ...... *H04L 63/1466* (2013.01); *G06F 12/1458* (2013.01); *G06F 21/55* (2013.01); *G06F 21/79* (2013.01); *G06F 2212/72* (2013.01)

(58) Field of Classification Search
CPC ............ H04L 63/1466; H04L 63/1433; G06F 12/1458; G06F 21/55; G06F 21/79; G06F 2212/72
See application file for complete search history.

(56) References Cited

U.S. PATENT DOCUMENTS 9,329,930 B2 \* 5/2016 Ingalls ................ G06F 11/1064
10,169,577 B1 \* 1/2019 Sobel .................... G06F 3/0623
(Continued)

FOREIGN PATENT DOCUMENTS

WO WO-2019070195 A1 \* 4/2019 ............. H04L 9/004

OTHER PUBLICATIONS

Yang et al.; "An Effective and Scalable VM Migration Strategy to Mitigate Cross-VM Side-Channel Attacks in Cloud", Apr. 2019, China Communications, pp. 151-171. (Year: 2019).\*

*Primary Examiner* — Matthew Smithers
(74) *Attorney, Agent, or Firm* — Invoke

(57) ABSTRACT

The present embodiments relate to identifying and mitigating memory bit flips in a cloud infrastructure service. The cloud infrastructure service can provide a monitoring system to monitor low level memory space to detect bit flips by the DRAM instances in the cloud infrastructure service. The bit flips detected in various DRAM computing instances can be processed to verify that the bit flips are sustained (e.g., and possibly relating to a Rowhammer attack) rather than transitory bit flips occurring in DRAM computing devices. Responsive to validating a set of bit flips at one or more computing instances, workloads associated with the affected computing instances can be migrated to other computing instances in the cloud infrastructure service.

20 Claims, 12 Drawing Sheets

(51) Int. Cl.
  *G06F 21/55*          (2013.01)
  *G06F 21/79*          (2013.01)

(56)                    References Cited

U.S. PATENT DOCUMENTS

|              |       |         |               |                |
| ------------ | ----- | ------- | ------------- | -------------- |
| 11,902,323   | B2 *  | 2/2024  | Avadhanam     | G06F 21/55     |
| 2020/0012600 | A1 *  | 1/2020  | Konoth        | G06F 11/1068   |
| 2020/0380130 | A1 *  | 12/2020 | Purushotham   | G06F 21/566    |
| 2021/0064459 | A1 *  | 3/2021  | Ramasamy      | G06N 5/04      |
| 2021/0349995 | A1 *  | 11/2021 | Qureshi       | G06F 12/0802   |
| 2021/0382798 | A1 *  | 12/2021 | Ganesan       | H04L 43/0876   |
| 2021/0406384 | A1 *  | 12/2021 | Jin           | G11C 7/24      |
| 2022/0115057 | A1 *  | 4/2022  | Pope          | G11C 11/40611  |
| 2022/0156159 | A1 *  | 5/2022  | Wang          | G06F 11/0727   |
| 2022/0262428 | A1 *  | 8/2022  | Bains         | G11C 11/40622  |
| 2022/0291837 | A1 *  | 9/2022  | Shao          | G06F 3/064     |
| 2022/0413959 | A1 *  | 12/2022 | Sethumadhavan | G06F 3/0619    |

* cited by examiner

100

DRAM BITFLIP DETECTOR 102

LIBRARY AT USER SPACE PROGRAM 104

KERNEL LEVEL MANAGER 106

MIGRATION MODULE 108

CONTAINER LEVEL MIGRATION MODULE 112

WORK LOAD MIGRATION AND POD MIGRATION 118

HOST LEVEL MIGRATION MODULE 110

REBOOT HOST IMAGE 116

WORKLOAD MIGRATION 114

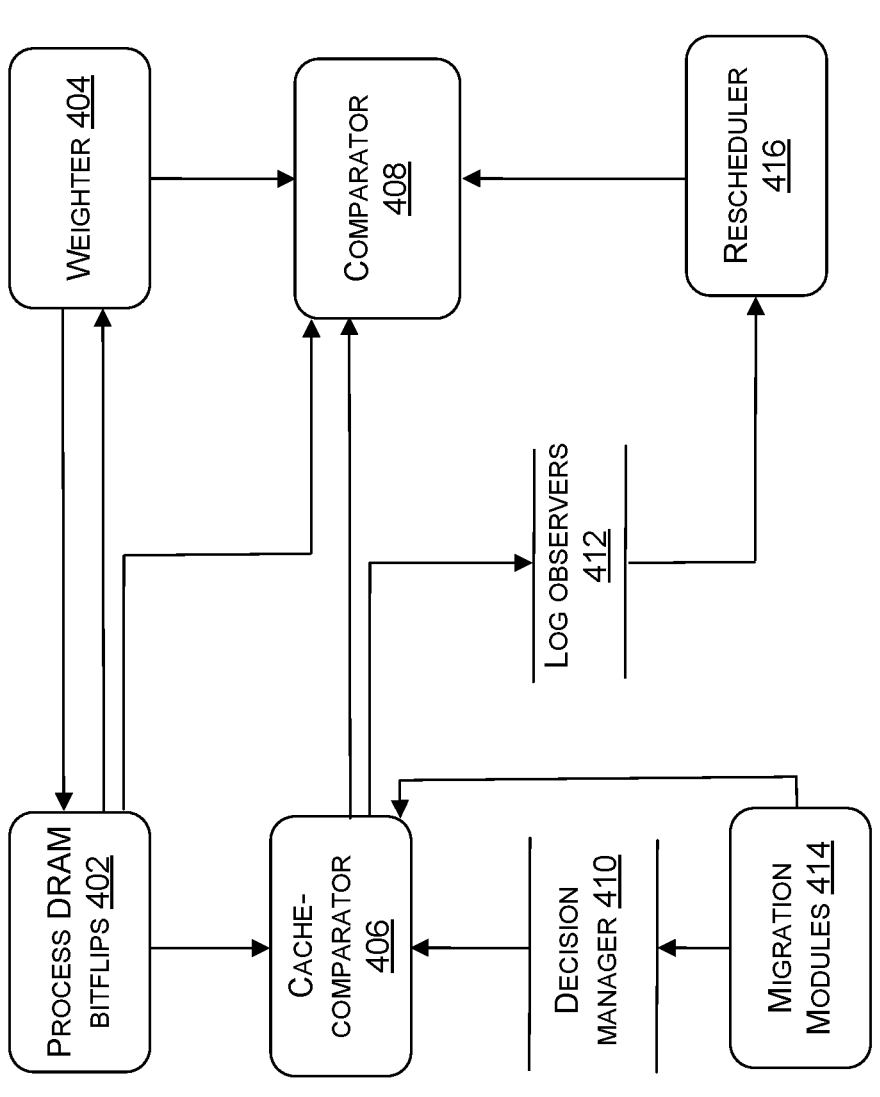
*FIG. 4*

600

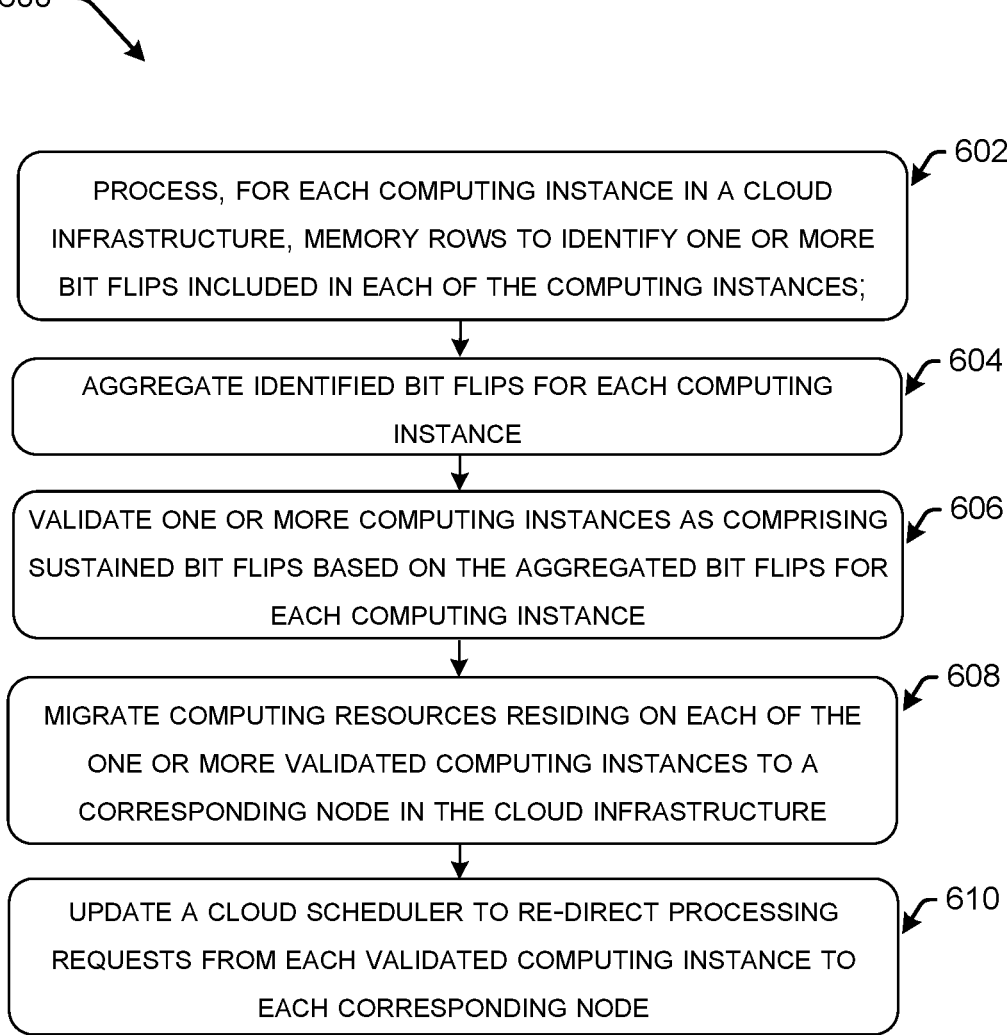

602

PROCESS, FOR EACH COMPUTING INSTANCE IN A CLOUD INFRASTRUCTURE, MEMORY ROWS TO IDENTIFY ONE OR MORE BIT FLIPS INCLUDED IN EACH OF THE COMPUTING INSTANCES;

604

AGGREGATE IDENTIFIED BIT FLIPS FOR EACH COMPUTING INSTANCE

606

VALIDATE ONE OR MORE COMPUTING INSTANCES AS COMPRISING SUSTAINED BIT FLIPS BASED ON THE AGGREGATED BIT FLIPS FOR EACH COMPUTING INSTANCE

608

MIGRATE COMPUTING RESOURCES RESIDING ON EACH OF THE ONE OR MORE VALIDATED COMPUTING INSTANCES TO A CORRESPONDING NODE IN THE CLOUD INFRASTRUCTURE

610

UPDATE A CLOUD SCHEDULER TO RE-DIRECT PROCESSING REQUESTS FROM EACH VALIDATED COMPUTING INSTANCE TO EACH CORRESPONDING NODE

*FIG. 6*

DYNAMIC CLOUD WORKLOAD REALLOCATION BASED ON ACTIVE SECURITY EXPLOITS IN DYNAMIC RANDOM ACCESS MEMORY (DRAM)

INCORPORATION BY REFERENCE; DISCLAIMER

Each of the following applications is hereby incorporated by reference: application Ser. No. 17/463,488 filed on Aug. 31, 2021. The applicant hereby rescinds any disclaimer of claims scope in the parent application(s) or the prosecution history thereof and advises the USPTO that the claims in the application may be broader than any claim in the parent application(s).

BACKGROUND

A computer system (e.g., a cloud computing infrastructure) can include a plurality of random-access semiconductor memory cells. An example of such cells can include dynamic random access memory (DRAM) memory cells that can store a plurality of bits of data and can include both a capacitor and a transistor. In such DRAM memory cells, a charge state of a capacitor (charged or discharged) can be what determines whether a DRAM cell stores "1" or "0" as a binary value for each bit.

Further, as computing resources increase for integrated circuits, more DRAM memory cells can be packed into integrated circuits. As more DRAM memory cells are packed into integrated circuits, a physical size of the memory cells may decrease and the memory cells can contain a lower charge, resulting in lower operational noise margins, increased rates of electromagnetic interactions between memory cells, and greater possibility of data loss. In some instances, DRAM memory cells may interact electrically between themselves by leaking their charges, which can change the contents of nearby memory rows that were not addressed in original memory access. The vulnerability of changing contents of nearby memory rows in memory cells is considered a "Rowhammer bug."

Further, this vulnerability may be exploited by a malicious entity. For instance, a malicious entity may execute a series of crafted memory access patterns (e.g., intense read/write requests) that rapidly activate the same memory rows numerous times in an attempt to flip bits (e.g., from "1" to "0") in adjacent rows of memory. The malicious entity can perform the series of memory access patterns to attempt to gain access or escalate privileges in the computing system. This type of attack is generally referred to as a "Rowhammer attack."

SUMMARY

The present embodiments relate to identification and mitigation of memory bit flips (e.g., Rowhammer attacks or the like) in a cloud infrastructure service. A first example embodiment provides a method performed by a cloud infrastructure node for detecting bit flips in one or more computing instances included in a cloud infrastructure service and migrating resources from the one or more computing instances. The method can include processing, for each computing instance in a cloud infrastructure service, a set of memory rows to identify one or more bit flips in each of the computing instances. The method can also include aggregating the identified bit flips for each computing instance. The method can also include validating one or more computing instances as comprising sustained bit flips based on the aggregated bit flips for each computing instance.

The method can also include, for each of the one or more validated computing instances, migrating computing resources residing on each of the one or more validated computing instances to one or more corresponding nodes in the cloud infrastructure service. The method can also include, for each of the one or more validated computing instances, updating a cloud scheduler to redirect processing requests from each validated computing instance to each of the one or more corresponding nodes.

A second example embodiment relates to a cloud infrastructure node. The cloud infrastructure node can include a processor and a non-transitory computer-readable medium. The non-transitory computer-readable medium can include instructions that, when executed by the processor, cause the processor to process, for each computing instance in a cloud infrastructure service, a set of memory rows to identify one or more bit flips in each of the computing instances. The instructions can further cause the processor to aggregate the identified bit flips for each computing instance by generating a bitmap comprising the identified bit flips for each computing instance. The instructions can further cause the processor to validate one or more computing instances as comprising sustained bit flips by processing the bitmap for each computing instance. Each of the one or more validated computing instances can be associated with a Rowhammer attack.

The instructions can further cause the processor to, for each of the one or more validated computing instances, migrate computing resources residing on each of the one or more validated computing instances to one or more corresponding nodes in the cloud infrastructure service. The instructions can further cause the processor to, for each of the one or more validated computing instances, update a cloud scheduler to redirect processing requests from each validated computing instance to each of the one or more corresponding nodes.

A third example embodiment relates to a non-transitory computer-readable medium. The non-transitory computer-readable medium can include stored thereon a sequence of instructions which, when executed by a processor causes the processor to execute a process. The process can include processing, for each computing instance in a cloud infrastructure service, a set of memory rows to identify one or more bit flips in each of the computing instances. Each computing instance can comprise a dynamic random-access memory (DRAM) cell. The process can also include aggregating the identified bit flips for each computing instance. The process can also include validating one or more computing instances as comprising sustained bit flips based on the aggregated bit flips for each computing instance. Each of the one or more validated computing instances can be associated with a Rowhammer attack.

The process can also include, for each of the one or more validated computing instances, migrating computing resources residing on each of the one or more validated computing instances to one or more corresponding nodes in the cloud infrastructure service. The process can also include, for each of the one or more validated computing instances, updating a cloud scheduler to redirect processing requests from each validated computing instance to each of the one or more corresponding nodes.

BRIEF DESCRIPTION OF DRAWINGS

FIG. 4 is a block diagram of a high level decision making system, according to at least one embodiment.

FIG. 6 is a flow process for an example method for detecting bit flips in one or more computing instances included in a cloud infrastructure service and migrating resources from the one or more computing instances, according to at least one embodiment.

DETAILED DESCRIPTION

A cloud computing environment can include a plurality of computing nodes with dynamic random access memory (DRAM) memory cells. In such environments, DRAM memory cells may interact electrically between themselves by leaking their charges, which can change the contents of nearby memory rows that were not addressed in original memory access. These inadvertent changes are sometimes called bit flips, because the corresponding bit in memory may "flip" from a "1" to a "0" or from a "0" to a "1." In some instances, a Rowhammer bug can include a security vulnerability occurring in such DRAM memory cells. The Rowhammer bug can be exploited by a malicious entity executing a series of crafted memory access patterns that rapidly activate the same memory rows numerous times in an attempt to cause a bit flip in adjacent rows of memory. In some cases, the end goal is an attempt to gain access/ privileges in the computing system. This type of attack is generally referred to as a Rowhammer attack. As an example, a malicious entity attempting a Rowhammer attack can exploit the Rowhammer bug to escalate a non-root user privilege to a root privilege, otherwise known as privilege escalation.

The present embodiments relate to identifying and mitigating a Rowhammer attack in a cloud infrastructure service. The cloud infrastructure service can provide a monitoring system to monitor low level memory space to detect bit flips of the DRAM instances in the cloud infrastructure service. The bit flips detected in various DRAM computing instances can be processed to verify that the bit flips are sustained (e.g., and likely relating to a Rowhammer attack) rather than transitory bit flips occurring in DRAM computing devices.

The system can also include a middle tier set of services and library of solutions for utility functions that can register as a listener for a memory map. Responsive to validating a set of bit flips at one or more computing instances, workloads associated with the affected computing instances can be migrated to other computing instances in the cloud infrastructure service. For instance, a logic functionality can connect and/or convert memory mapped monitoring artifacts into key performance indicators (KPIs) for a cloud native scheduling input.

The present embodiments can provide for efficient identification and mitigation of a Rowhammer attack in a cloud infrastructure service. For instance, responsive to identifying and validating bit flips representing a Rowhammer attack, workloads can be migrated from the affected computing instances, which can stop the Rowhammer attack at the identified computing instances. Further, the malicious entity may be unable to perform a root privilege escalation by migrating the workloads from the affected computing instances and freezing the boundaries of the computing instances while continuing the processing of legitimate processing tasks at new computing instances.

Figure 1:
FIG. 1 is a block diagram illustrating an example process for identification and mitigation of a Rowhammer attack in a cloud infrastructure service, according to at least one embodiment.

FIG. 1 is a block diagram illustrating an example process 100 for identification and mitigation of a Rowhammer attack in a cloud infrastructure service. The process can include a DRAM bit flip detector 102, a library at a user space program 104, and a kernel level manager 106.

The DRAM bit flip detector 102 can include low level memory monitoring resources to detect bit flips (e.g., changing of a binary bit from "0" to "1" or the reverse) at memory rows. The DRAM bit flip detector 102 can read adjacent rows to extract any bit flips and save the bit flips into data structures referred to as bitmaps. The bitmaps can be processed to determine whether the bit flips are sustained (and validated) or only transitory and not representative of a Rowhammer attack.

A library at a user space program 104 can include a library at a user space in the cloud infrastructure service that can initiate the monitoring of low level memory for bit flips. The user space can include a segregated portion of memory storing a library identifying the memory cells in the cloud infrastructure service. The library can provide an architecture of all memory cells, otherwise known as a memory map. The memory map can be used for determining whether a bit flip occurred and/or determining whether a memory cell has sustained bit flips as described herein. For instance, the library at a user space program 104 can insert a kernel driver and instruct the kernel driver to monitor for bit flips in memory cells. A kernel level manager 106 can interact with a memory map to monitor for bit flips in the memory cells.

A migration module 108 (or "repaving module") can include a module configured to migrate computing resources (e.g., or workloads) and requests to perform computing tasks from affected computing instances. The migration module 108 can include a host level migration module 110 migrating resources at a host level and a container level migration module 112 migrating resources at a container level. The host level migration module 110 can include a workload migration module 114 to migrate workloads from affected computing instances at a host level. Further, the host level migration module 110 can include a reboot host image module 116 to reboot an old host image for the affected computing instances. The container level migration module 112 can include a workload migration and pod migration module 118 to migrate workloads from the affected computing instances.

A. Bit Flip Detection

As described above, a bit detector (e.g., 102) can monitor low level memory (e.g., DRAM memory cells) to determine bit flips in the memory. Further, the bit detector can validate detected bit flips as sustained bit flips representing a Rowhammer attack, rather than transient bit flips naturally occurring in DRAM memory cells.

Detecting bit flips can include registering a bit flip detection driver to monitor memory rows to detect bit flips in DRAM memory cells. For instance, this can include components capable of inspecting adjacent rows and determining bit flips in the adjacent memory rows.

Detecting a bit flip can include incorporating a statistical formula utilizing a weighted average for each DRAM type. For instance, the weight for each DRAM type can reflect a mathematical possibility of DDR bit flips in each DRAM type, and a cumulative effect of transient bit flips versus sustained bit flips. Table 1 below provides an example illustration of weighted averages for each DRAM type:

TABLE 1

| list of DRAMs | Weight |
| --- | --- |
| LPDDR-1, LPDDR-2 | 0.5 |
| Cache-1 | 0.75 |
| DDR2 | 0.25 |
| SD Card | 0.01 |
| eMMC | 0.01 |
| High Speed USB | 0.01 |
| SDIO | 0.25 |

As an illustrative example, a first cache memory (e.g. Cache-1) can include a weight of 0.75, which can reflect a possibility of DDR bit flips and a cumulative effect of transient bit flips versus sustained bit flips the first cache memory. In this example, a SD card memory may have a weight of 0.01, which can reflect a lower possibility of DDR bit flips and a lower cumulative effect of transient bit flips versus sustained bit flips. A register weight can include a product of a number of parameters for each memory type and the weight of each memory type.

A bit flip detector can access each memory row for each computing instance according to a specified order. The detector can access a set of adjacent rows and read the adjacent rows to obtain contents (e.g., bit values) for the rows. The detector can read and save row contents prior to performing read/write operations on the rows to determine any changes to the bit values after inspecting the memory rows. If the detector identifies a number of bit flips, the detector can remove any false positive bit flips and/or trigger computing resource migration.

The bit flip detector can validate any detected bit flips by performing a validation process. The validation process can include extracting bit flip data and saving the data into data structures called bit maps mapping the adjacent rows of memory. The bitmap mapping the rows of memory for each computing instance can be processed by performing a mathematical exclusive or (XOR) operation for adjacent rows to derive a delta value for each set of rows. The derived delta values for adjacent rows in a computing instance can be summated to derive a total sum of the differences (e.g., bit flips). If the total sum exceeds a predetermined threshold, the bit flips for the computing instance are sustained. If the total sum does not exceed the threshold, the detector can continue to accumulate memory data and identify any bit flips as transitory. In some instances, the bitmaps can be processed using functions such as a min, max, standard deviation, and threshold variant functions.

Figure 2:
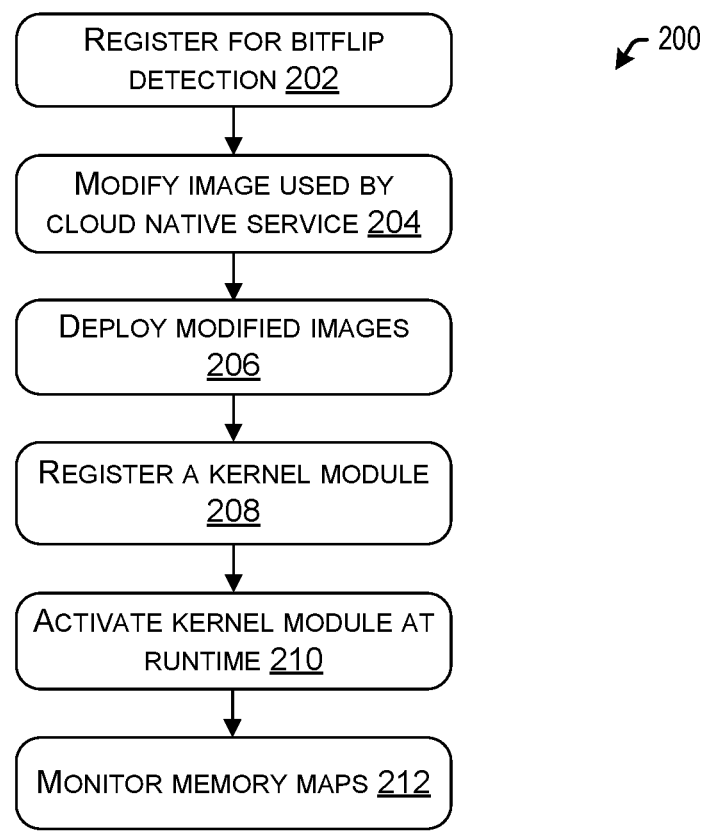
FIG. 2 is a flow diagram illustrating a process for bit flip detection, according to at least one embodiment.

FIG. 2 is a flow diagram illustrating a process 200 for bit flip detection. At 202, a bit flip detector can register for bit flip detection. The bit flip detector can prepare to monitor low level memory and identify any bit flips in the memory instances. In some instances, responsive to registration being unsuccessful, the bit flip detector can generate an error report specifying a reason for the registration being unsuccessful.

At 204, the bit flip detector can modify an image used by a cloud native service. The bit flip detector can obtain an immutable image and modify the image for monitoring for bit flips. The image can be used to identify changes in the memory instances (e.g., bit flips).

At 206, the bit flip detector can deploy the modified image(s). Deploying the modified images can include preparing the images for monitoring the memory instances. For instance, the modified images can be used in a comparison with identified bits in memory to identify a bit flip in a memory cell.

At 208, after deployment of the modified images, the bit flip detector can register a kernel module for a memory manager. The kernel module can be executed by kernel level manager (e.g., 106). The registered kernel module can be used for monitoring the memory maps as described herein.

At 210, the kernel module can be activated at runtime. Activating the kernel module can initiate monitoring the memory instances to identify instances of bit flips in the memory maps. For example, the kernel module can monitor bitmaps for each memory instance to identify bits (and any bit flips) by comparing the bitmaps with the modified images for the memory instances.

At 212, the memory maps can be monitored. This can allow for identification of bit flips, and the identified bit flips can be used to validate a computing instance as being associated with a Rowhammer attack as described herein.

B. Transitioning of Computing Resources from Affected Computing Instances

As described above, the bit flip detector can identify one or more computing instances that comprise bit flips that are sustained, likely from a Rowhammer attack. The system as described herein can perform a memory sweeping process to migrate resources from the affected computing instances.

Figure 3:
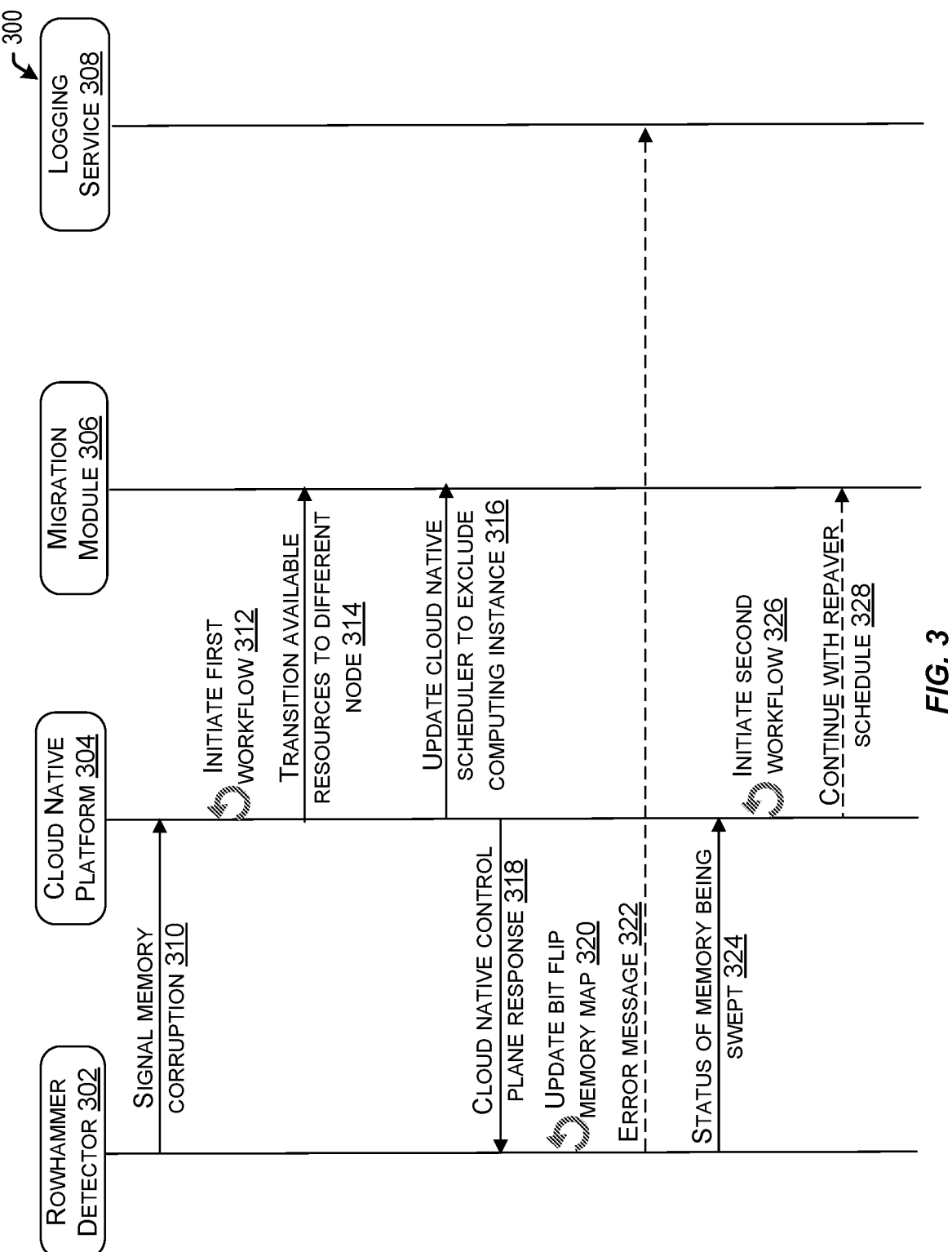
FIG. 3 is a signaling process illustrating an example memory sweeping process, according to at least one embodiment.

FIG. 3 is a signaling process illustrating an example memory sweeping process 300. At 310, a Rowhammer detector 302 (e.g., a bit flip detector) can signal a memory corruption to the cloud native platform control plane 304. The memory corruption can include detecting a number of sustained bit flips in one or more affected computing instances. The signal to the cloud native platform control plane 304 can be to migrate resources and subsequent processing requests from the affected computing resources.

At 312, the cloud native platform control plane 304 can initiate a first workflow. The first workflow can initiate the transition of resources and subsequent processing requests from the affected computing resources. For example, the first workflow can identify the impacted memory instance (and associated computing resources for the memory instance) and a computing instance capable of handling the computing resources handled by the impacted computing instance.

At 314, the cloud native platform control plane 304 can transition all available resources to a different node/pod. This can include instructing the migration module 306 to identify a new node or series of nodes to migrate resources. The migration module 306 can migrate computing resources (e.g., services, applications) from the affected computing instances to the identified new nodes to perform the processing tasks associated with the computing resources.

At 316, the cloud native platform control plane 304 can update a cloud native scheduler to exclude the affected computing instances. The cloud native scheduler can control processing request distribution to computing instances and can divert processing requests to new nodes to handle the processing requests. For example, responsive to receipt of a request to perform a processing task using computing resources by the affected computing instance, the scheduler can redirect the request to the new computing instance executing the computing resources.

At 318, the cloud native platform control plane 304 can send a cloud native control plane response to the Rowhammer detector 302. The cloud native control plane response can specify that the computing resources have been migrated from the affected computing resources.

At 320, the Rowhammer detector 302 can update a bit flip memory map. The updates to the bit flip memory map can specify a type of memory, a bit flip category (e.g., single bit flips, multiple bit flips, cache corruptions, I-Cache and D-cache corruptions), and/or an address range.

Detecting a bit flip may differ based on a type (or vendor) associated with DRAM devices used in the cloud infrastructure service and/or storage services. For example, for a given computing instance, a corresponding threshold value can be identified and used for determining whether bit flips in the computing instance are transitory or sustained, indicative of a Rowhammer attack. In some instances, for every bit flip identified for a particular computing instance, an exponential mathematical equation can be applied, which can output a cumulative sum of a floating point number (or decimal points). The calculated floating point number can be used for identifying and removing any momentary bit flips, leaving only sustained bit flips at each computing instance.

In some instances, responsive to the bit flip memory map update failing, at 322, an error message can be sent from the Rowhammer detector 302 to a logging service 308 to log the error. The error message can provide details relating to the failure of the bit flip memory map update, such as a reason for the failure or a timestamp of the failure, for example. An example of a failure of the bit flip memory map update can include a data size of an updated memory map not corresponding with an original memory map used to detect bit flips or null values included in the updated memory map.

At 324, the Rowhammer detector 302 can provide a status of whether the memory is swept to the cloud native platform control plane 304. The status of whether the memory is swept can indicate if the bit flip memory map has been updated and whether resources have been migrated from the affected computing instances. In some instances, a kernel driver can register with lower layer driver software and can inject at random memory locations at runtime. This can comprise the sweeping of a memory for a DRAM section.

At 326, the cloud native platform control plane 304 can initiate a second workflow. The second workflow can transition states for the computing instances and update databases to identify the affected computing instances and the new nodes that resources were migrated.

At 328, in some instances, the cloud native platform control plane 304 can send a message to continue with the migration schedule to the migration module 306. This can be performed responsive to the memory sweep not being completed (e.g., as specified in 324).

FIG. 4 is a block diagram of a high level decision making system 400. The cloud computing environment can perform processing tasks relating to the high level decision making system as described herein. The system can process DRAM bit flips 402 to monitor memory of computing instances for bit flips. Processing DRAM bit flips 402 can include registering a memory map monitor, scanning memory regions, and comparing the memory regions to identify any bit flips.

A weighter 404 can classify the bit flips by flip type. The weighter can also assign weights to the bit flips by DRAM type and associate tags with bit flips based on bit flip type and/or DRAM type. The weighter 404 can also log and store metadata for each bit flip, such as a timestamp of detecting a bit flip or a computing instance associated with each bit flip, for example.

A cache comparator 406 can monitor cache types and compare bit flips in various cache types. For instance, the cache comparator can include an instruction cache (I-cache), a data cache (D-cache) monitor, and a L2 cache monitor. The I-Cache and D-Cache may not have transient flips, as they are more protected at hardware levels, so a greater weight can be assigned to I-Cache and D-cache flips or corruption.

A comparator 408 can compare bit flips. For instance, the comparator 408 can compare single bit flips and compare multi-bit flips. The comparator can be used in validating bit flips as sustained bit flips.

A decision manager 410 can interact between migration modules 414 and cache comparator 406. The decision manager 410 can determine whether computing resources have been migrated from affected computing instances and/or whether a memory bit map has been swept.

Log observers 412 can obtain error logs in the event of an error being detected. For instance, responsive to an unsuccessful updating to a memory map (e.g., at 322), an error message can be logged at the log observer 412. The error messages received at log observers 412 can include details relating to the error, such as an error type or a timestamp of detecting the error, for example.

Migration modules 414 can facilitate migration of resources from affected computing instances to new nodes. For instance, the migration module 414 can include a wind down container cluster, transfer clusters, transfer pods, and reset containers. The migration module 414 can identify nodes to migrate resources and migrate the resources to the identified nodes.

A rescheduler 416 can update schedulers to redirect processing requests from the affected computing instances. The rescheduler 416 can reschedule workloads from the affected computing instances, re-host existing applications on new computing nodes, and migrate the new workloads to the new computing nodes.

Figure 5:
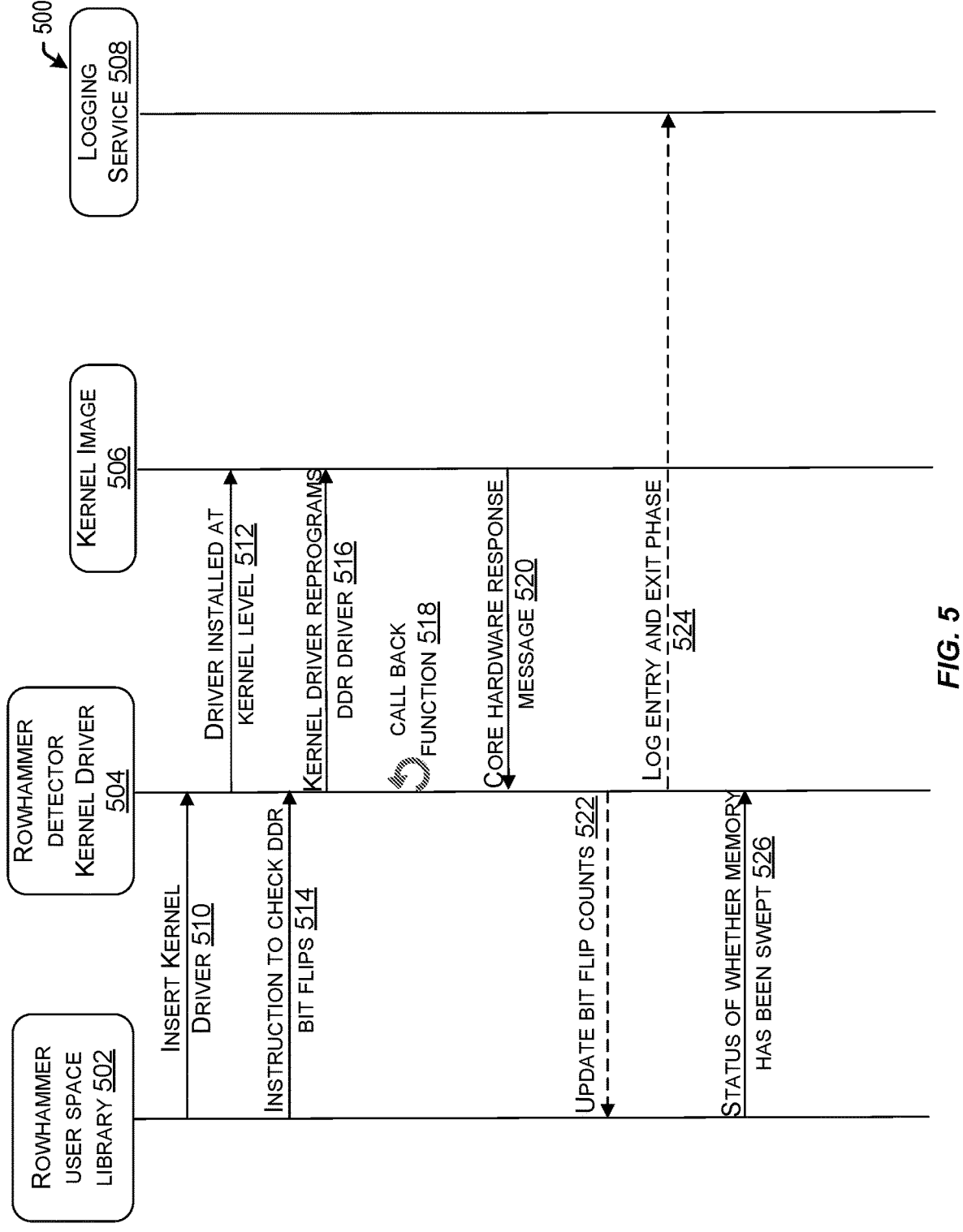
FIG. 5 is a signaling process illustrating kernel and user space boundaries for bit flips, according to at least one embodiment.

FIG. 5 is a signaling process 500 illustrating kernel and user space boundaries for bit flips. At 510, a Rowhammer user space library 502 can send a message to insert kernel driver to insert a library at the Rowhammer detector kernel driver 504. The kernel driver can include a reconfiguration function to insert the library. For example, inserting the library to the kernel driver 504 can allow for detecting bit flips using the memory maps included in the library.

At 512, a Rowhammer detector kernel driver 504 can send a message indicating that the driver has been installed at a kernel level to a kernel image 506. The Rowhammer detector kernel driver 504 can wait for a trigger or signal from the kernel image 506. Responsive to sending the message indicating that the driver has been installed, the Rowhammer detector kernel driver 504 can initiate processing of the memory cells to detect bit flips.

At 514, the Rowhammer user space library 502 can send a message to check for DDR bit flips at the Rowhammer detector kernel driver 504. The user space can detect memory allocations prior to informing the Rowhammer detector kernel driver 504 to check for DDR bit flips.

At 516, the Rowhammer detector kernel driver 504 can send a message for an I-cache driver to start the collection of metrics at a kernel image 506. The kernel driver 504 can reprogram a DDR driver prior to sending the message to start the collection of metrics.

At 518, the Rowhammer detector kernel driver 504 can register a call back function. The call back function can call back hardware and memory mapped IO space such that after a threshold is reached, the kernel driver 504 can receive a call back.

At 520, the kernel image 506 can provide a message indicating that the core hardware response driver is reprogrammed and is prepared to collect bit flips. The message can also specify a result of the call back function (e.g., whether the Rowhammer detector kernel driver 504 successfully performed the call back function).

At 522, the Rowhammer user space library 502 can update bit flip counts, provide a device foot print, timestamps, and a memory map. This can include a type of memory, a bit flip category, and an address range.

In some instances, at 524, a Rowhammer detector kernel driver 504 can log the entry and exit a phase if a threshold is not reached. The log entry can specify the bit flips counts, memory map, and the computing instance in which the bit flips were identified. The log entry can specify bit flips and other corresponding data for each computing instance. The log entry data can be used for subsequent processing, such as for detecting a computing instance in which a Rowhammer attack is occurring, for example.

At 526, the Rowhammer user space library 502 can send a message indicating whether a status of the entire memory has been swept or not to the Rowhammer detector kernel driver 504.

C. Example Method for Identifying and Mitigating a Rowhammer Attack

FIG. 6 is a flow process for an example method 600 for detecting bit flips in one or more computing instances included in a cloud infrastructure service and migrating resources from the one or more computing instances. For instance, a cloud infrastructure node can identify a Rowhammer attack occurring on one or more computing instances and migrating computing resources from the affected computing instances.

At 602, a set of memory rows for each computing instance in a cloud infrastructure service can be processed to identify one or more bit flips in each of the computing instances. For instance, adjacent memory rows of each computing instance (e.g., a DRAM memory cell) can be compared to identify bit flips occurring at the computing instance.

In some instances, a kernel module can be registered for a memory map corresponding to each computing instance. The memory map can be utilized in monitoring the memory cells for bit flips and identifying bit flips in the memory of each computing instance. Further, the kernel module can be activated at runtime.

At 604, the identified bit flips for each computing instance can be aggregated. A total number of identified bit flips can be processed to validate the bit flips as comprising a Rowhammer attack or comprise transient bit flips naturally occurring in such integrated circuits. For instance, a bitmap can be generated that includes a series of data structures comprising the identified bit flips arranged by adjacent memory rows. The bitmap can be used as a basis for validating the computing instances as described below.

At 606, one or more computing instances can be validating as comprising sustained bit flips based on the aggregated bit flips for each computing instance. The one or more validated computing instances can comprise computing instances (e.g., DRAM memory cells) that are likely associated with a Rowhammer attack.

Validating the one or more computing instances further comprises performing a mathematical exclusive or (XOR) operation to derive a delta value for each set of adjacent memory rows at each computing instance. Validating the computing instances can also include summating derived delta values for each set of adjacent memory rows to derive a summated delta value and determining whether the summated delta value exceeds a threshold value. Responsive to determining that the summated delta value exceeds the threshold value, the one or more computing instances can be validated.

In some instances, a DRAM type for each computing instance (e.g., I-cache, SD card) can be identified. Further, a weighting factor that corresponds to each DRAM type can be identified. For instance, the weighting factors can be identified from a table (e.g., Table 1 described above). A register weight can be assigned for each computing instance using the weighting factor. The summated delta value can be modified using the register weight.

At 608, for each of the one or more validated computing instances, computing resources residing on each of the one or more validated computing instances can be migrated to one or more corresponding nodes in the cloud infrastructure service. For instance, a migration module can migrate computing resources (e.g., applications, services) executing on an affected computing instances to one or more computing nodes capable of performing processing tasks executing on each affected computing instance.

In some instances, migrating the computing resources can include selecting the one or more corresponding nodes as nodes with a threshold amount of available computing resources to obtain migrated computing resources. Both a host-level migration module and a container-level migration module can be implemented to migrate workloads at both a host level and a container level from the one or more validated computing instances to the one or more corresponding nodes.

At 610, for each of the one or more validated computing instances, a cloud scheduler can be updated to redirect processing requests from each validated computing instance to each of the one or more corresponding nodes. This can allow for affected computing instances (e.g., computing instances affected by a Rowhammer attack) to be isolated and to remove computing resources from these computing instances (e.g., to avoid privilege escalation).

In some instances, the validated computing instances can be frozen to prevent any additional damage to the cloud infrastructure service. This can include identifying boundaries of a memory cell and preventing communication or connection to other nodes in the cloud infrastructure service. This can prevent a malicious entity being able to expand a Rowhammer attack to other computing instances or executing a root privilege escalation.

D. System Overview

Figure 7:
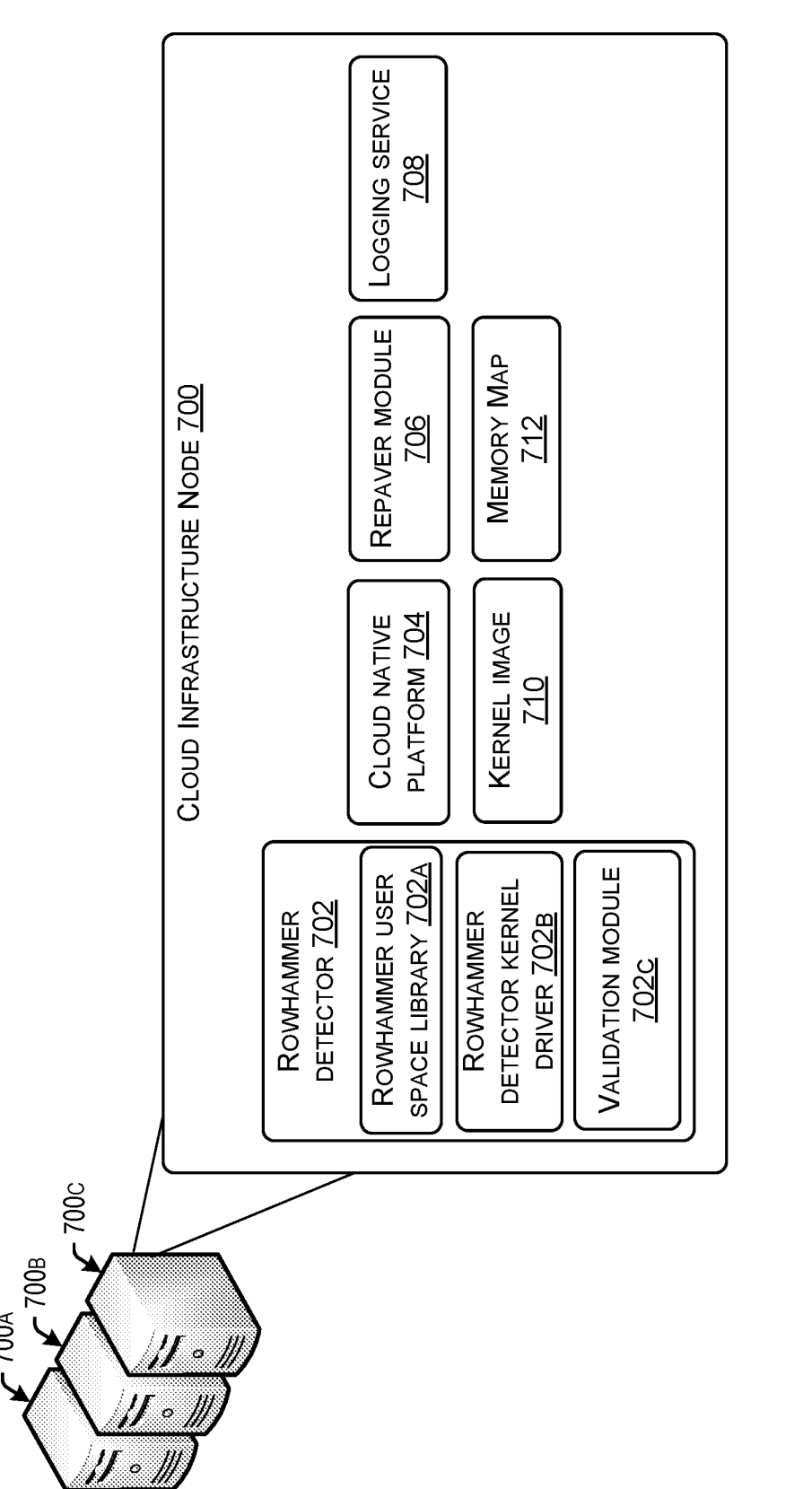
FIG. 7 is a block diagram of an example cloud infrastructure node, according to at least one embodiment.

FIG. 7 is a block diagram of an example cloud infrastructure node 700. The cloud infrastructure node 700 can include one or more interconnected servers (e.g., 700*a-c*) capable of performing processing tasks as described herein.

The cloud infrastructure node 700 can include a Rowhammer detector 702. The Rowhammer detector 702 can monitor low level memory of computing instances (e.g., DRAM memory cells) to identify bit flips and/or whether the bit flips are indicative of a Rowhammer attack for a computing instance.

The Rowhammer detector 702 can include a Rowhammer user space library 702*a*.

The Rowhammer user space library 702*a* can include a user space identified in virtual memory of the cloud infrastructure node 700 that can insert a kernel driver and instruct a kernel driver (e.g., 702*b*) to check for bit flips as described herein. The Rowhammer detector kernel driver 702*b* can monitor the memory cells according to an order to identify bit flips in the memory cells.

The Rowhammer detector 702 can also include a validation module 702*c*. The validation module 702*c* can inspect detected bit flips to determine whether the computing instance includes sustained bit flips (e.g., and is related to a Rowhammer attack). For instance, the validation module can process adjacent rows and assemble identified bit flips in a bitmap, perform a mathematical XOR operation to derive delta values for each adjacent row in a computing instance. The delta values for each memory cell can be summated to generate a summated delta value. Responsive to the summated delta value exceeding a threshold, the computing instance can be validated as likely related to a Rowhammer attack.

The cloud infrastructure node can include a cloud native platform 704. The cloud native platform 704 can interact with the Rowhammer detector 702 and migration module 706 to initiate the migration of resources from validated computing instances to one or more corresponding computing instances. The migration module 706 can migrate computing resources from the validated computing instances and update a cloud native scheduler to prevent requests being directed to the validated computing instances. A logging service 708 can log errors occurring when migrating resources or updating a memory map as described herein.

A kernel image 710 can be used in the monitoring of low level memory for bit flips. For instance, the Rowhammer detector kernel driver 702*b* can be installed at a kernel level and reprogram the driver using the kernel image 710. A memory map 712 can include a mapping of memory rows for each computing instance. The memory map 712 can be utilized in monitoring the memory rows for bit flips (e.g., by the Rowhammer detector 702).

E. Iaas Overview

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need (or, alternatively, be desired/expected) to be set up. In some instances, the provisioning can be done manually, a provisioning tool may be utilized to provision the resources, and/or deployment tools may be utilized to deploy the code once the infrastructure is provisioned.

Figure 8:
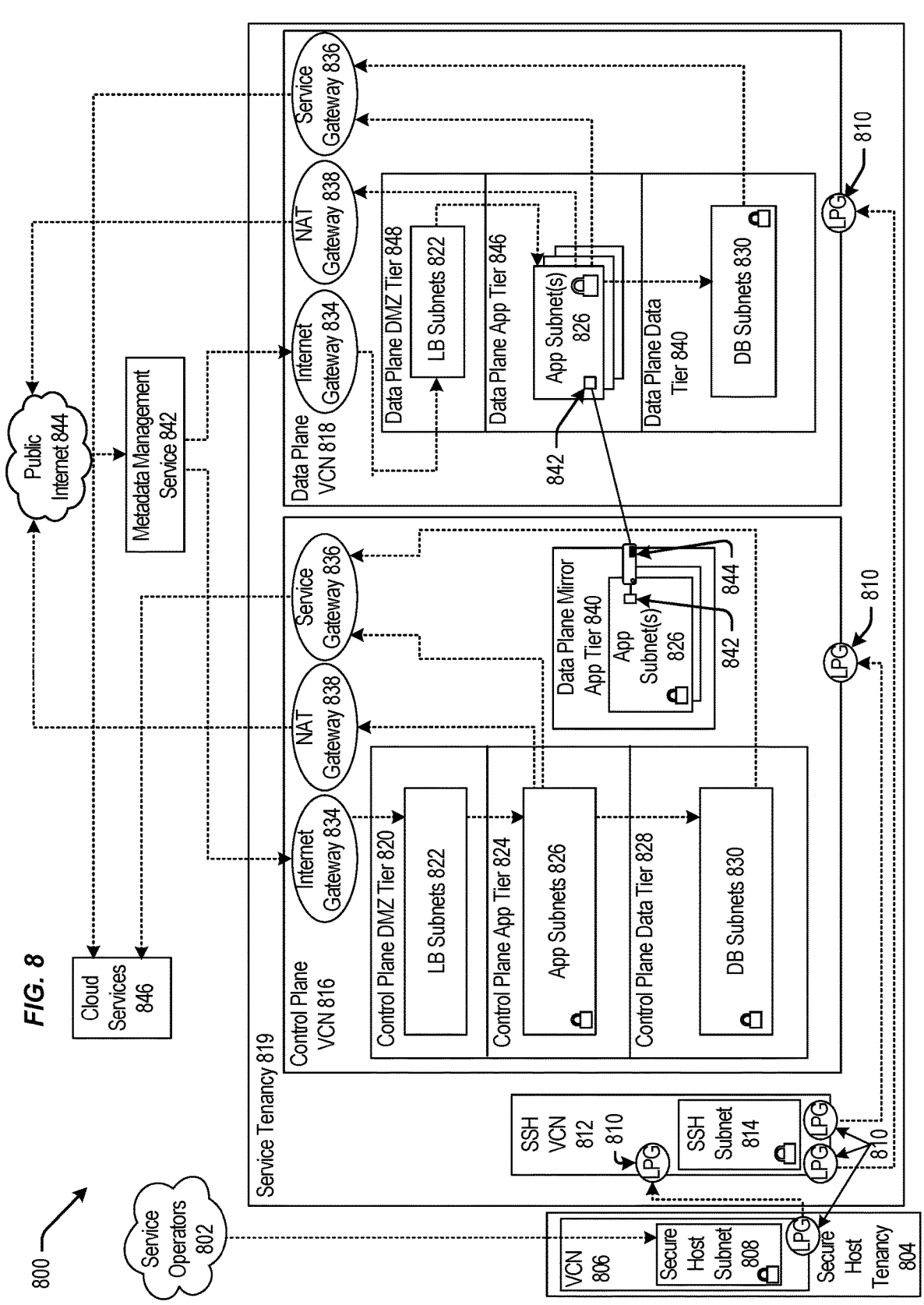
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 8111 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane minor app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 8111, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 8111.

The control plane VCN 816 may allow users of the service tenancy 8111 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane minor app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 8111. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 8111. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 8111, which may be isolated from public Internet 854.

Figure 9:
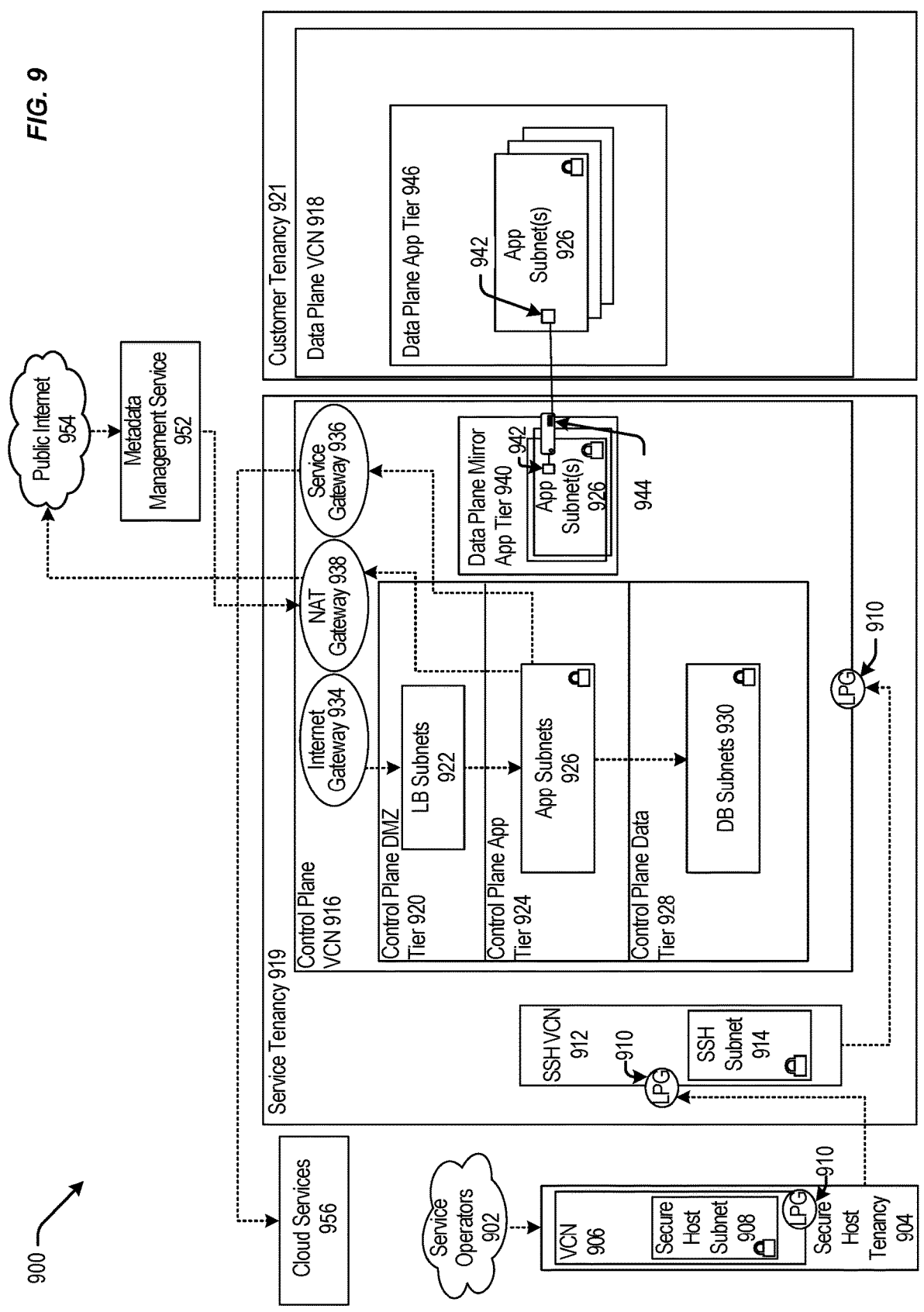
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 9111 (e.g. the service tenancy 8111 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG.

8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane minor app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane minor app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 9111. Each compute instance 944 may allow communication between the control plane VCN 916, contained in the service tenancy 9111, and the data plane VCN 918 that is contained in the customer tenancy 921. The compute instance 944 may allow resources, that are provisioned in the control plane VCN 916 that is contained in the service tenancy 9111, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane minor app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
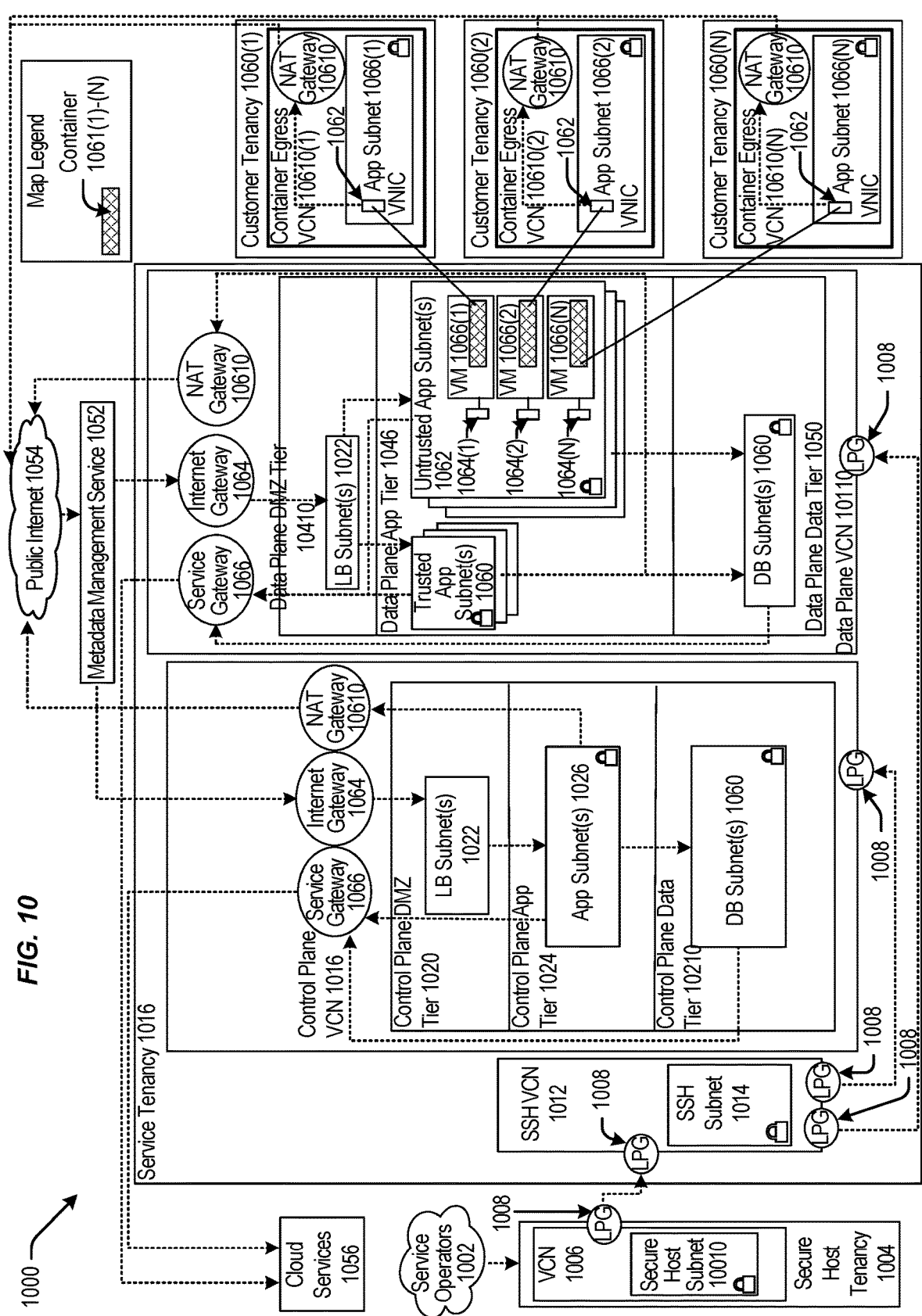
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 10111 (e.g. the service tenancy 8111 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024

(e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1069(1)-(N) that can be contained in respective container egress VCNs 1068(1)-(N) that can be contained in respective customer tenancies 1090(1)-(N). Respective secondary VNICs 1092(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1090. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1090. Respective containers 1091(1)-(N) contained in the VMs 1066(1)-(N) may be configured to run the code. In this case, there can be a dual isolation (e.g., the containers 1091(1)-(N) running code, where the containers 1091(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1091 (1)-(N) may be communicatively coupled to the customer tenancy 1090 and may be configured to transmit or receive data from the customer tenancy 1090. The containers 1091 (1)-(N) may not be configured to transmit or receive data from any other entity in the data plane VCN 1018. Upon completion of running the code, the IaaS provider may kill or otherwise dispose of the containers 1091(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1091(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
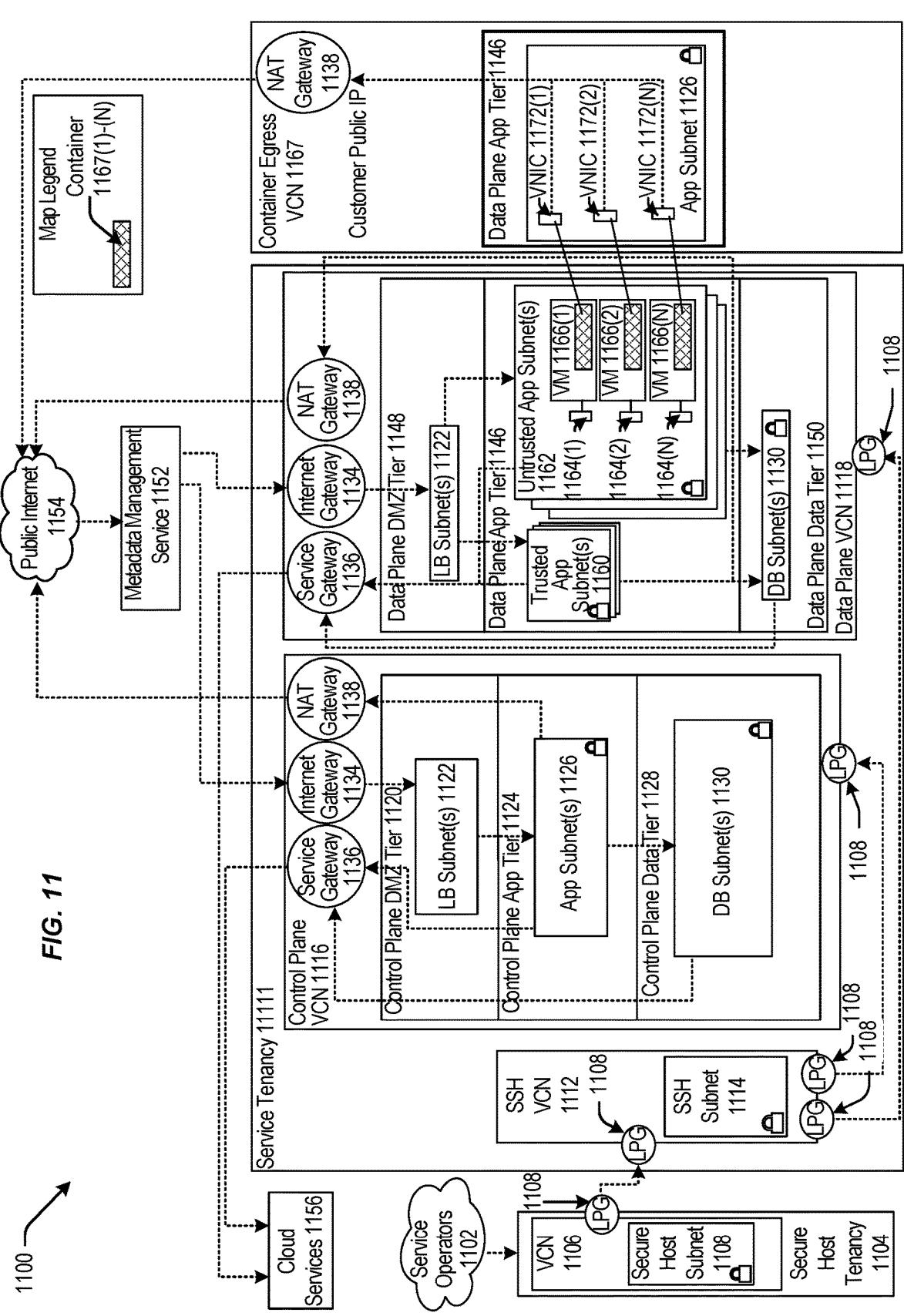
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 11111 (e.g. the service tenancy 8111 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1169(1)-(N), and be communicatively coupled to an app subnet 1126 that can be contained in a data plane app tier 1146 that can be contained in a container egress VCN 1168. Respective secondary VNICs 1192(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1169(1)-(N) that are contained in the VMs 1166(1)-(N) for each customer can be accessed in real-time by the customer. The containers 1169(1)-(N) may be configured to make calls to respective secondary VNICs 1192(1)-(N) contained in app subnet(s) 1126 of the data plane app tier 1146 that can be contained in the container egress VCN 1168. The secondary VNICs 1192(1)-(N) can transmit the calls to the NAT gateway 1138 that may transmit the calls to public Internet 1154. In this example, the containers 1169(1)-(N) that can be accessed in real-time by the customer can be isolated from the control plane VCN 1116 and can be isolated from other entities contained in the data plane VCN 1118. The containers 1169(1)-(N) may also be isolated from resources from other customers.

In other examples, the customer can use the containers 1169(1)-(N) to call cloud services 1156. In this example, the customer may run code in the containers 1169(1)-(N) that requests a service from cloud services 1156. The containers 1169(1)-(N) can transmit this request to the secondary VNICs 1192(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
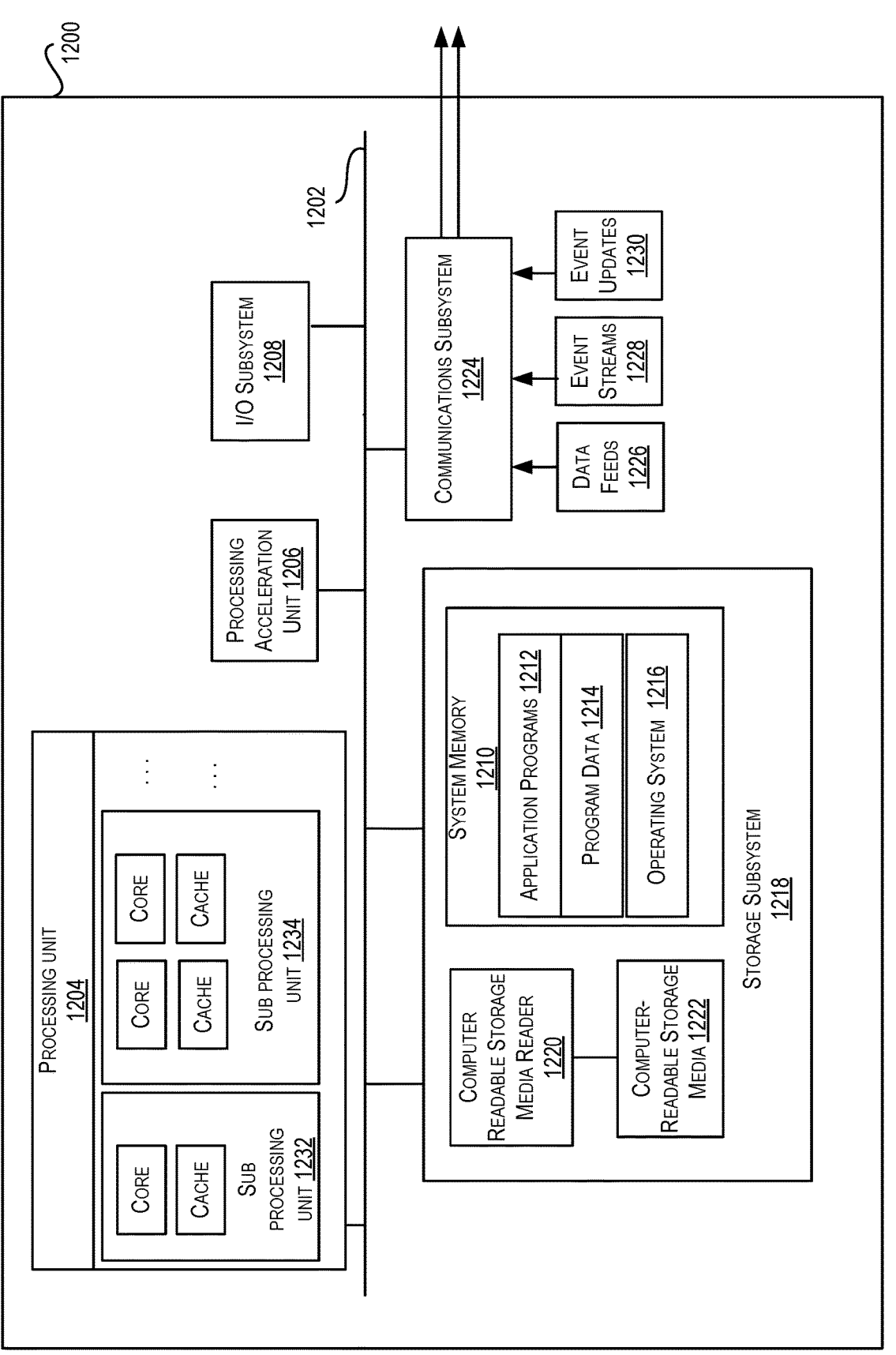
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1002.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
processing, for one or more computing instances in a cloud infrastructure service, a set of memory rows to identify one or more bit flips in the one or more computing instances;
validating at least a subset of the one or more computing instances as comprising sustained bit flips based at least in part on the one or more bit flips identified in the one or more computing instances; and
responsive to validating the subset of the one or more computing instances as comprising sustained bit flips:
migrating one or more computing resources residing on the subset of one or more validated computing instances to one or more corresponding nodes in the cloud infrastructure service.

2. The method of claim 1, further comprising:
updating a cloud scheduler to redirect processing requests from the subset of one or more validated computing instances to the one or more corresponding nodes.

3. The method of claim 1, further comprising:
generating a bitmap for a computing instance of the one or more computing instances, the bitmap comprising a set of one or more bit flips identified in the computing instance,
wherein the computing instance is validated as comprising sustained bit flips by processing the bitmap.

4. The method of claim 3, further comprising:
obtaining an immutable image for the computing instance; and
modifying the immutable image to generate a modified image for the computing instance,
wherein processing the bitmap comprises:
comparing the bitmap for the computing instance to the modified image for the computing instance.

5. The method of claim 1, wherein validating at least the subset of the one or more computing instances as comprising sustained bit flips comprises:
applying an exponential mathematical equation to a bit flip of the one or more bit flips to generate a value; and
determining that the bit flip is a sustained bit flip based at least in part on analyzing the value.

6. The method of claim 5, wherein the value is a cumulative sum of a floating-point number or a decimal-point number.

7. The method of claim 1, wherein the method is performed by a cloud infrastructure node.

8. A system, comprising:
at least one device including a hardware processor; and
the system being configured to perform operations comprising:
processing, for one or more computing instances in a cloud infrastructure service, a set of memory rows to identify one or more bit flips in the one or more computing instances;
validating at least a subset of the one or more computing instances as comprising sustained bit flips based at least in part on the one or more bit flips identified in the one or more computing instances; and
responsive to validating the subset of the one or more computing instances as comprising sustained bit flips:
migrating one or more computing resources residing on the subset of one or more validated computing instances to one or more corresponding nodes in the cloud infrastructure service.

9. The system of claim 8, wherein the operations further comprise:
updating a cloud schedule to redirect processing requests from the subset of one or more validated computing instances to the one or more corresponding nodes.

10. The system of claim 8, wherein the operations further comprise:
generating a bitmap for a computing instance of the one or more computing instances, the bitmap comprising a set of one or more bit flips identified in the computing instance,
wherein the computing instance is validated as comprising sustained bit flips by processing the bitmap.

11. The system of claim 10, wherein the operations further comprise:
obtaining an immutable image for the computing instance; and
modifying the immutable image to generate a modified image for the computing instance,
wherein processing the bitmap comprises:
comparing the bitmap for the computing instance to the modified image for the computing instance.

12. The system of claim 8, wherein validating at least the subset of the one or more computing instances as comprising sustained bit flips comprises:
applying an exponential mathematical equation to a bit flip of the one or more bit flips to generate a value; and
determining that the bit flip is a sustained bit flip based at least in part on analyzing the value,
wherein the value is a cumulative sum of a floating-point number or a decimal-point number.

13. The system of claim 8, wherein validating a computing instance is associated with a Rowhammer attack.

14. One or more non-transitory computer-readable media comprising instructions that, when executed by one or more hardware processors, causes performance of operations comprising:
processing, for one or more computing instances in a cloud infrastructure service, a set of memory rows to identify one or more bit flips in the one or more computing instances;
validating at least a subset of the one or more computing instances as comprising sustained bit flips based at least in part on the one or more bit flips identified in the one or more computing instances; and
responsive to validating the subset of the one or more computing instances as comprising sustained bit flips:
migrating one or more computing resources residing on the subset of one or more validated computing instances to one or more corresponding nodes in the cloud infrastructure service.

15. The one or more non-transitory computer-readable media of claim 14, wherein the operations further comprise:

updating a cloud scheduler to redirect processing requests from the subset of one or more validated computing instances to the one or more corresponding nodes.

16. The one or more non-transitory computer-readable media of claim 14, wherein the operations further comprise:

generating a bitmap for a computing instance of the one or more computing instances, the bitmap comprising a set of one or more bit flips identified in the computing instance, wherein the computing instance is validated as comprising sustained bit flips by processing the bitmap.

17. The one or more non-transitory computer-readable media of claim 16, wherein the operations further comprise:

obtaining an immutable image for the computing instance; and modifying the immutable image to generate a modified image for the computing instance, wherein processing the bitmap comprises:

comparing the bitmap for the computing instance to the modified image for the computing instance.

18. The one or more non-transitory computer-readable media of claim 14, wherein validating at least the subset of the one or more computing instances as comprising sustained bit flips comprises:

applying an exponential mathematical equation to a bit flip of the one or more bit flips to generate a value; and determining that the bit flip is a sustained bit flip based at least in part on analyzing the value.

19. The one or more non-transitory computer-readable media of claim 18, wherein the value is a cumulative sum of a floating-point number or a decimal-point number.

20. The one or more non-transitory computer-readable media of claim 14, wherein the one or more computing instances comprise dynamic random access memory (DRAM) memory cells.

* * * * *